(12) United States Patent
Roark et al.

(10) Patent No.: US 8,645,349 B2
(45) Date of Patent: Feb. 4, 2014

(54) INDEXING STRUCTURES USING SYNTHETIC DOCUMENT SUMMARIES

(75) Inventors: Evan Matthew Roark, Heggedal (NO); Rune Djurhuus, Oslo (NO)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/359,506

(22) Filed: Jan. 27, 2012

(65) Prior Publication Data

US 2013/0198221 A1    Aug. 1, 2013

(51) Int. Cl.
*G06F 17/30* (2006.01)
(52) U.S. Cl.
USPC .......................... 707/705; 707/706; 707/707
(58) Field of Classification Search
USPC .......................... 707/705, 706, 707
See application file for complete search history.

(56) References Cited

U.S. PATENT DOCUMENTS

| | | | |
|---|---|---|---|
| 7,441,007 B1 | 10/2008 | Kirkpatrick et al. | |
| 7,493,555 B2 * | 2/2009 | Costa et al. | 715/249 |
| 7,519,908 B2 | 4/2009 | Quang et al. | |
| 7,974,981 B2 * | 7/2011 | Zhao et al. | 707/769 |
| 2005/0188305 A1 * | 8/2005 | Costa et al. | 715/530 |
| 2005/0278445 A1 | 12/2005 | Quang et al. | |
| 2010/0042602 A1 | 2/2010 | Smyros et al. | |
| 2011/0022600 A1 | 1/2011 | Sathe et al. | |
| 2011/0265177 A1 | 10/2011 | Sokolan et al. | |

FOREIGN PATENT DOCUMENTS

| | | |
|---|---|---|
| EP | 2083364 A1 | 7/2009 |
| KR | 10-0493399 61 | 6/2005 |

OTHER PUBLICATIONS

"Property Restriction Keyword Queries", May 2010, Retrieved at <<http://msdn.microsoft.com/en-us/library/ff394509.aspx>>, pp. 6.
"Entities, Properties, and Keys", Retrieved at <<http://code.google.com/appengine/docs/python/datastore/entities.html>>, Retrieved Date: Nov. 23, 2011, pp. 8.
Andrew Greensted, "Java Configuration File API", Sep. 25, 2010 Retrieved at <<http://www.labbookpages.co.uk/software/java/javaConfig.html>>, Retrieved Date : Nov. 24, 2011,pp. 6.
"Properties", Retrieved at <<http://ant.apache.org/manual/properties.html>>, Retrieved Date : Nov. 24, 2011, pp. 6.
International Search Report dated May 9, 2013 in International Application No. PCT/US13/022434.

* cited by examiner

*Primary Examiner* — Baoquoc N To
(74) *Attorney, Agent, or Firm* — Hope Baldauff, LLC

(57) ABSTRACT

A search engine provides efficient and scalable search queries for documents using a document summaries index file structure. The document summaries index file structure comprises an index portion and a records portion. The index portion contains a plurality of document identifiers, each of which is linked to a record in the record values portion. The records portion includes a document summary that may include a number of fields, including a name-length, name, type, and value-length, and value. Each record value is searched to determine if the contents matches criteria in the search request. The document summaries index file can be modified to add new indexable criteria in a scalable and efficient manner.

20 Claims, 6 Drawing Sheets

INDEXING STRUCTURES USING SYNTHETIC DOCUMENT SUMMARIES

BACKGROUND

Various web services may perform file searches as a part of a web service. For example, a web service may provide document management services allowing users to search, create, edit and store documents or other types of information in a cloud based server. In some instances, the user may be able to directly search for documents including information within a certain context. In other applications, performing a search may be necessary to perform a document management related service. For example, a user requesting to edit a document may require the system to first search for documents saved in the user's file space in order to identify the specific document. In many instances, the web service may be providing similar document management services for other users, including other users associated with an enterprise. Thus, the web service providing the document management service may store and provide access to a large number of documents not only for the user, but for many others.

The indexing information is used to organize files associated in a user's file space, and the indexing information may be stored in separate files. This may include separate files for the schema (a.k.a. indexing criteria) and for the contents. Whenever information about the user's schema is updated or modified, appropriate changes may be required in the various indexing files associated with that user. Older versions of the schema may be required for backwards compatibility. Maintaining consistency among these indexing files can be processing intensive. As the number of hosted users, files, and schemas increase, there is an increasing need in maintaining an efficient and updated index of the documents.

It is with respect to these and other considerations that the disclosure made herein is presented.

SUMMARY

Concepts and technologies are described herein for providing an improved index file structure used in fulfilling search requests in a web service that provides database services, such as a document management system. The improved index file structure incorporates synthetic document summaries.

In one embodiment disclosed, a computer implemented method for processing a request for a document search includes receiving a query for at least one document from an application programming interface wherein the query includes a search term identifier value and a search term value. The method further includes receiving a document summaries index file into a memory of a computer, where the document summaries index file includes an index portion and a records portion. The index portion includes a plurality of document identifiers, each identifying a document. The records portion includes at least one record for each document identifier linked to a corresponding document identifier. Each record has a structure comprising a name field, a type field, and a value field.

The method further includes processing the document summaries index file by a processor of the computer to ascertain for each record in the records portion whether the name field is equal to the search term identifier, and if so then determining whether the value field is equal to the search term value. The method further includes providing to the application programming interface that generated the query each document identifier where the name field is equal to the search term identifier and the value field is equal to the search term value.

In another embodiment disclosed, a computer readable storage medium stores instructions thereon that when executed by a processor cause the processor to receive a query for a document search that includes at least one document, wherein the query includes a search term identifier and a search term value. The instructions further cause the processor to receive a document summaries index file into a memory of a computer, the document summaries index file including an index portion and a records portion. The index portion includes a plurality of document identifiers each identifying a document and the records portion includes at least one record associated with each document identifier. Further, each record has a structure that includes a name field, a type field, and a value field.

The instructions further cause the processor to process the document summaries index file to ascertain for each record in the records portion whether the name field is equal to the search term identifier, and if so then determining whether the value field is equal to the search term value. The instructions further cause the processor to provide to an application programming interface that generated the query each document identifier where the name field is equal to the search term identifier and the value field is equal to the search term value.

In yet another embodiment disclosed, a computing system for processing a request for a document search includes a memory storing a document summaries index file including an index portion and a records portion. The index portion includes a plurality of document identifiers each identifying a document and the records portion includes at least one record for each document identifier, each record having a structure comprising a name field, a type field, and a value field. The computer system further includes a processor configured to receive a query from an application programming interface for the document search wherein the query includes a search term identifier and a search term value. The processor is further configured to compare each record in the record value portion to ascertain whether the search term identifier matches name field, and if so whether the search term value matches the value field. Finally, the processor is further configured to provide to the application programming interface that generated the query each document identifier where the search term identifier matches the name field and the search term value matches the value field.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
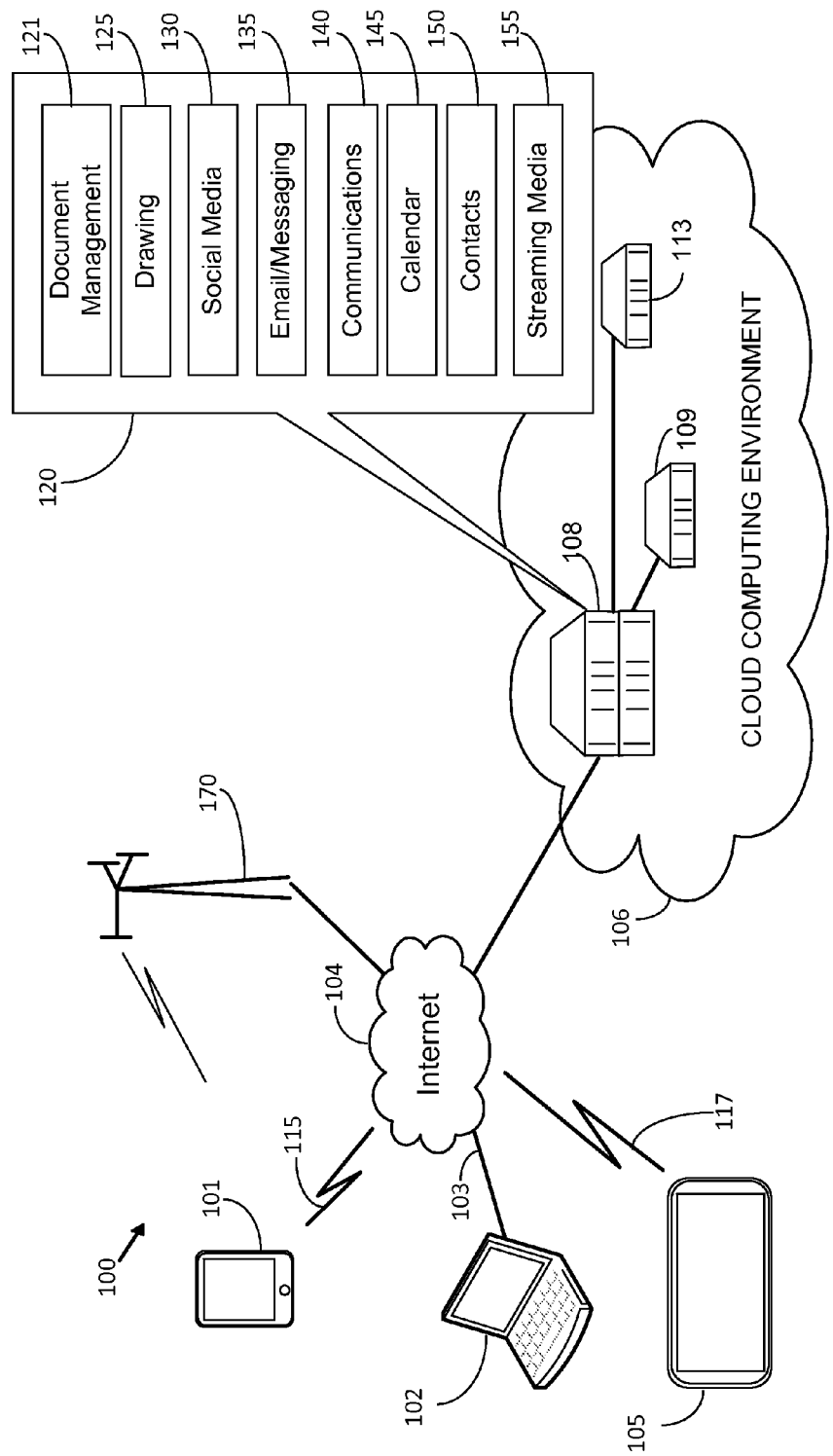
FIG. 1 illustrates one environment of user computing devices interacting with a web server according to one embodiment presented herein.

In the following detailed description, references are made to the accompanying drawings that form a part hereof, and which are shown by way of illustration of specific embodiments or examples. In the drawings, like numerals represent like elements throughout the several figures.

The following detailed description is directed to providing an improved index file structure used in fulfilling search requests. One context could be a web based service environment employing a database system for retrieving documents. Specifically, one such application is a document management system storing documents for users of an enterprise. The documents may comprise various document types, such as memos, letters, instructional guides, articles, etc. The document types may also include spreadsheets and graphical-oriented documents. Graphical oriented documents may include slide presentations and animations, which may also be multi-media in nature. Many enterprises frequently store a variety of business documents in electronic form, and other examples can be enumerated. The documents could also be files representing web site pages or other information. The index file structure is flexible and scalable so that it can accommodate changes in the schema or search criteria as defined by a user, as well as accommodate different types of documents.

An enterprise may find it convenient to store information with a service provider providing a document management service in a cloud computing environment. Using a cloud computing environment frees the enterprise from having to maintain, operate, and administer the necessary computing system(s). In one embodiment, the document management service provider offers web-based access to a cloud computing environment hosting the service. The cloud computing environment may host a number of enterprises, thereby providing economies of scale. Consequently, the number of documents stored in the cloud computing environment may be quite large. Although the cloud computing environment may store documents for various enterprises, each enterprise's information is logically distinct.

When searching for documents, some high level attributes may be defined as search criteria that generally apply to various types of documents. For example, many conventional documents have an author. The author can be defined as the name of the person that created the letter, memo, brochure, slide presentation, web page, etc. Other attributes may include a title of the document, date of creation, description of the contents, etc. This information can be stored and indexed for each document either at the time of creation or at a later point. These information types can comprise search criteria and can be define by the document management system or directly by the user. This information may be referred to as a "document summary." It can also be referred to as a "synthetic" document summary since it is generated by a computer application, not by the author. As used herein, the document summary is an instance or example of a particular category of information. The category of information can be termed a "retrievable property," or "managed property." Thus, a retrievable property may be an author of a document (e.g., a category) and a particular document may have a document summary indicating the author was John Doe (e.g., an instance of the category). In many embodiments, a document may have a plurality of managed properties (such as author and title), each typically having a single instance or associated document summary.

In one prior art approach for indexing documents, the list of managed properties (a.k.a. "a schema") was defined and contained in one file and the corresponding contents were contained in another file. It was necessary to ensure that these two files were consistent. If the schema is fixed (e.g., the list of managed properties never changes), then maintaining consistency between the category of the managed property in one file and the contents of the managed property in the other file is not too difficult.

However, to provide greater flexibility for users, it may be desirable to alter the schema or list of managed properties for a user's documents. Specifically, the service provider may offer the user the ability to define the list of managed properties that can be searched. For example, some users may find it sufficient to search for documents based on the author's name or date of creation. Other users may find it useful to also search using additional information, for example the document size or last editing date. When additional managed properties are defined, then the schema is changed. When changing the schema, the corresponding indexing file structures need to be updated, and in some cases, the old indexing file structure is maintained for backward compatibility. Thus, maintaining a consistent and current indexing structure may become difficult as the size of the system is scaled up.

Turning now to the figures, one context for applying the technologies disclosed herein is shown in the system illustration 100 of FIG. 1. In FIG. 1, the user could employ various types of computing devices that execute a client application for receiving the document management services from the service provider. The client application may communicate with a web server providing the document management services. The computing devices could be a smartphone 101, a laptop computer 102, or a tablet computing device 105. The concepts disclosed are not limited to using only these types of computing devices, as the concepts can be used by desk top computers and other types of devices known to those skilled in the art.

The computing devices may utilize wireless connections 115, 117, for interacting with servers located a cloud computing environment 106. The data from the computing devices are conveyed in one embodiment by the Internet 104 to the cloud computer environment 106. The communications can be based on various readily available technologies, including various cellular based technologies (CDMA, GSM, 4G, EDGE, etc.) originating from cellular infrastructure 170 provided by a cellular service provider. Various wireless technologies (e.g., WiMax, WiFi, etc.) could be used. Wired technologies providing wired communications 103 could also be used and may be based on ISDN, cable modems, DSL, and other well-known technologies.

The connectivity afforded by the wired 103 and wireless 115, 117, communications through the Internet 104 provides the computing devices with access to servers 108 in the cloud computing environment 106. Although the concepts illustrated herein may refer to a single server 108, there may be various servers or other configurations involved in the cloud computing environment 106. For example, one server 108 accessed may, in turn, access another server 113 in order to fulfill a service request. A plurality of servers may be used in order to provide the services disclosed herein.

The server 108 may execute various application programs 120. These programs may be executed in a shared or distributed manner across one or more servers in cooperation with a client application executing in the computing devices 101, 102, or 105. The application programs 120 may include a document management application 121 used to provide the aforementioned document management services. The document management services may allow the user to save a created or retrieved document in the server 108, and control access by other users. One such product for providing document management capabilities is the SHAREPOINT® product available from Microsoft® Corporation, which may operate in conjunction with other applications executing in the computing device, such as WORD®, also available from Microsoft® Corporation.

The application programs 120 may include other types of applications, such as a drawing application 125 for creating and editing graphical oriented programs. Applications for editing images, video, etc. may also be considered with the scope of the drawing application.

Other applications executing on the server 108 may include social media applications 130 for group related messaging and communications. Another application program present may be an email/messaging application 135 that is involved in various messaging capabilities, including instant messaging. A communications application 140 may allow for video chat or voice communication. A calendar application 145 may allow for organizing meetings and events. A contacts application 150 may allow for organizing contact information for the user and/or individuals associated with an enterprise. A streaming media application 155 may provide for streaming digital data, such as audio or video files. Each of these applications may store data, which the server 108 may maintain in a data store 109 in the cloud computing environment 106. Each of these varied applications may store data is that can be indexed and searched using the concepts disclosed herein. Although the examples provided may focus on a document management system, this does not limit application of the technology herein to other types of services.

Each of the applications 120 may interact with a client application executing in the computing devices 101, 102, and 105. Various communication protocols may be used over the Internet 104 between the computing devices and the server 108. In one embodiment, these protocols may be HTTP based protocols that are used in providing access to the servers.

Figure 2:
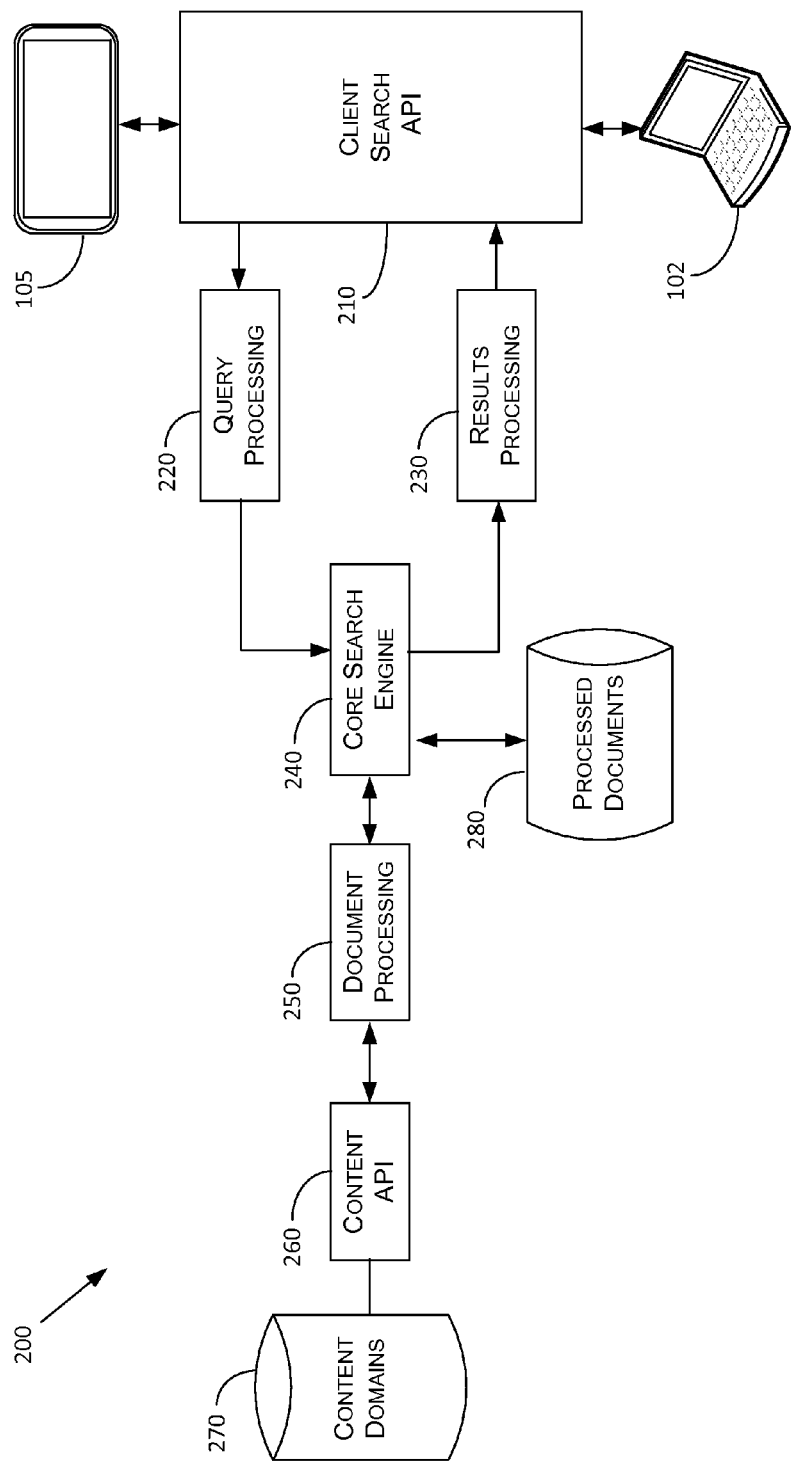
FIG. 2 is a schematic diagram depicting modules used in processing a query associated with a document search.

FIG. 2 illustrates a schematic diagram 200 depicting modules used in processing a query by one or more servers 108. The request or query may originate in response to a user action, which may involve, for example, a user interacting with a graphical user interface provided on a tablet computing device 105 or a laptop 102 executing a client application (not shown). The client computing devices may interface using a client search application programming interface 210 ("API"). Other devices or modules may be used in conjunction with the client search API 210. Various forms of graphical user interfaces may be used in aiding the user in forming the request. In other embodiments, an application program in the server or client computing device may initiate the request in order to fulfill a user's service request without being directly initiated by the user's action.

A search engine can provide services for a multitude of content domains (270). These can be, for example, a document management system, an email server, databases, or anything else that provides content.

Content enters the system through the content API (260), which is an abstraction layer that provides a uniform interface for injecting content to the system, regardless of its format. The content is then transformed into a form that the core search engine (240) can process by the document processing module (250), by first identifying the type of content it is, and then extracting the common information, such as author, creation date, and file type. In other words, the document processing module (250) separates a document into properties and values, where the properties may be retrievable by the core search engine. Once the documents have been transformed, they are sent to the core search engine for indexing and storage (280) according to the structure discussed below in conjunction with FIG. 4.

The query will include some search criteria to search for files or documents. This criteria may be, for example, a list of all documents that contains certain specified words. The client search API 210 forms the query and then directs the query to the query processing module 230. There, the query is parsed and structured in a form that the core search engine 240 can process.

Figure 3:
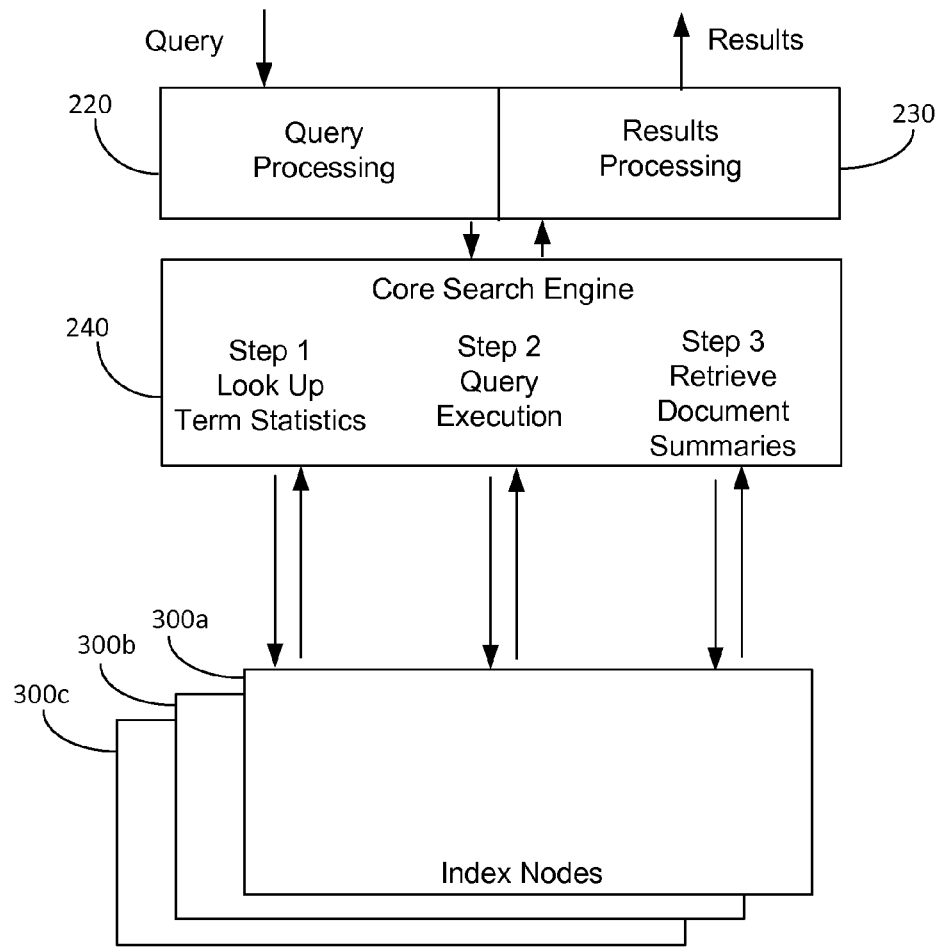
FIG. 3 is an overview of steps associated with retrieving a document summaries index file.

The remaining operations disclosed herein largely involve the core search engine module 240, which is illustrated in further detail in FIG. 3. FIG. 3 illustrates the core search engine 240 receiving a query from the processing module 220. The core search engine 240 at a high level performs three steps to fulfill the query. In step 1, the core search engine 240 looks up various search term statistics. The core search engine 240 may gather how many instances of the search terms in the search request are stored in each of the index nodes 300a-300c in the overall system. The result provides an indication of how many search results will be returned. In many instances, only a subset of the search results are initially returned to the user. For example, the user's computing device may adequately display 5-15 search results. The user may indicate to view further search results after reviewing the initial results.

In step 2, the core search engine executes the query for the search terms at the index nodes which store instances of the search term. The result of the query is a list of documents that fulfill ("match") the query, identified by document identifiers (which may be simply a 64 bit unsigned integer, in one embodiment).

The document summaries index file includes instances of document identifiers and a link to the first of its associated document summaries. A single document summary is a specific instance of a specific managed property. There can be more than one specific instance of a specific managed property per document, and even more than one specific instance per specific managed property (a document can have several authors, for example). The document summaries retrieved in step 3 are often short, and are often text based instances of the document's properties for the particular managed property. However, in some embodiments, the document summary can be non-text based, and can be relatively lengthy.

In one embodiment, the document summaries may include text identifying an author, title, or brief document description of a document. A document summary may also comprise date information, such as the creation date of the document. Each document summary is a distinct, indexable piece of information about a document, which can be retrieved in response to the user's original search query. Typically, for a limited number of document identifiers returned in step 2 (e.g., the first 10 document identifiers), document summaries comprising the author, creation date, and uniform resource locator ("URL") are retrieved.

The retrieved document summaries are provided by the core search engine 240 to the results processing module 230, which may limit the presentation of the results to a defined limit for the user. This limit may be suited, for example, to the size of the user's display device. Thus, a maximum limit of ten initial results per page may be displayed on one type of computing device, and another limit of five results per page may be display on another type of computing device. Ranking mechanisms may be employed to determine the order in which the results are presented.

The managed properties (a.k.a. retrievable properties) define the categories of information that are indexed for a user's documents. The managed properties may be initially determined as a default value by an administrator or the service provider. If the managed property does not exist (e.g., it is not defined), then that category cannot be the basis for searching documents. In other words, if a search category is not defined, it cannot be specified in the request for performing a search.

However, the absence of a particular managed property does not prevent the user defining a new managed property. Once a new managed property is defined for a schema, all subsequent documents generated or saved by the user can be indexed on that basis. For example, if the user created a new managed property for searching based on the size of a document, then that information can be summarized on a going forward basis whenever the user creates or edits a document. It is also possible to have prior documents re-indexed on the basis of the newly added managed property. Continuing with the above example, it is it possible to re-process previously created user documents to determine their size and populate that information in the document summaries index file. The process of re-processing documents to generate the document summary reflecting the new managed property is sometimes called "re-crawling." Thus, to re-crawl the database is to create new document summaries for a newly defined managed property. Re-crawling can be done after the documents are created.

Modifying the schema by adding a new managed property can result in difficulties in maintaining an accurate and current indexing data structure. Further, because the index structure is used to search from a potentially large volume of documents managed by the service provider, an efficient indexing structure can impact the speed in providing search results. As the number of users, schemas, and the number of documents managed in the cloud computing environment increases, an inefficient indexing structure can adversely affect the performance not only for the user or enterprise, but potentially other users or enterprises receiving services from the cloud computing environment 106.

Figure 4:
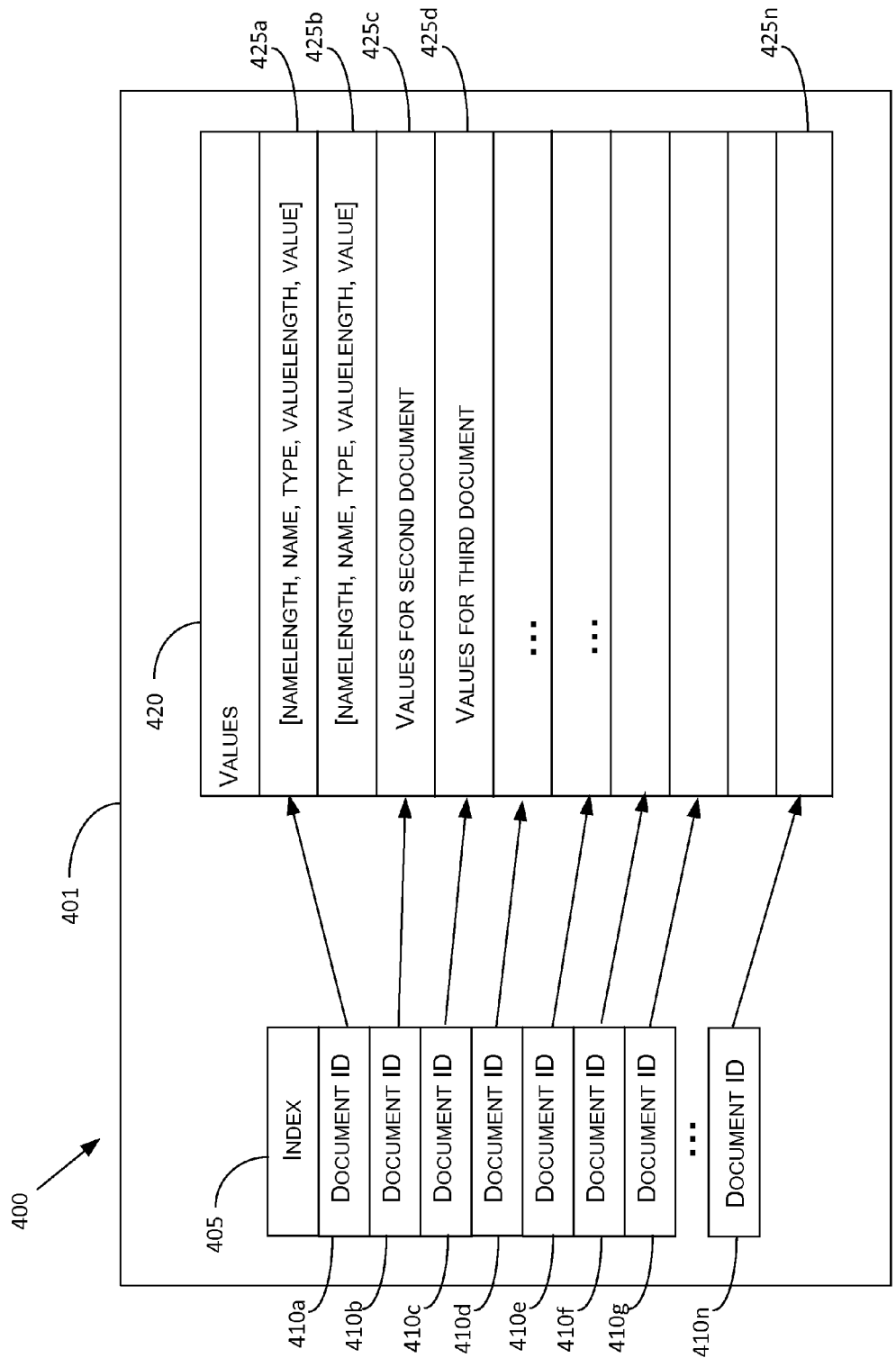
FIG. 4 is a data structure associated with the document summaries index file.

One embodiment 400 for a scalable and efficient indexing file structure is shown in FIG. 4. FIG. 4 shows a document summaries indexing file 401 which incorporates an index portion 405 and a records portion 420 in a single structure. The index portion 405 comprises a number of document IDs 410*a*-410*n*, which identify a corresponding document. The index portion 420 is simply a document ID, and a link to the first of the retrievable managed properties for that document. In the index portion, a document ID only occurs once, but each document can have several properties associated with it. The document ID may be, in one embodiment, a 64 bit integer.

Each document ID 410*a*-410*n* is associated with a pointer or link to a value record in the records portion 420 that represents the first record for the document. Each record can be structured as follows:

[Namelength, Name, Type, Valuelength, Value]

Thus, the first record 425*a* may indicate a first value of a managed property of a first document, and the second record 425*b* may indicate a second value of another managed property that is also associated with the first document. In many instances, a document may have multiple records, each associated with a different managed property for the document.

The Namelength field is typically a fixed size, and the value contained therein represents the number of bytes in the Name field. The Namelength field may be, in one embodiment, two bytes. In other embodiments a larger or smaller field size can be used. A two byte length would allow for names of up to $2^{16}$ or 65K bytes in) length. Since each byte can have 256 different values, there are $(2^{16}*2^8=)2^{24}$ possible Names. An escape mechanism for allowing a greater number of Name identifiers can be defined if necessary.

The Name field indicates the name of the managed property. Specifically, the value in the Name field indicates the meaning of the data in the Value field. An example of a Name field may be "Author" or "Title." Other examples may include "Description," "Date," or other document related criteria.

The Type field indicates the nature of the data of the indicated Value field. This indicates how the value is interpreted. Examples of the Type values include: string, integer, decimal, Boolean, date, or other value. For example, an author may be indicated using string type data indicating the name, the size of a document may be indicated using an integer type data indicating the number of bytes, and a creation date may be indicated using a date type data.

The next field, Valuelength is a fixed field that in one embodiment may be 32 bits, which can indicate a byte length of the Value field up to $2^{32}$ bytes (four gigabytes). The last field is the Value itself, which has a length indicated by the Valuelength field. The data in the Value field is of the data type indicated in the Type field.

For example, a particular record in the records portion 420 of the document summaries index file 401 may indicate an author of the document. The record associated with this could be:

[6, Author, String, 8, John Doe].

Another example may be a description of the document, which could be:

[11, Description, String, 43, Preliminary Testing Results of Beta Release].

In the latter example, the "11" indicates that the following eleven bytes includes a Name value, which is the value "Description." The contents of the Value field is of a type "string." The string itself is 43 bytes and indicated in the Value field and is "Preliminary Testing Results of Beta Release." In some embodiments, the contents of Value may be compressed, to provide further storage efficiencies.

The above structure provides a flexible and efficient structure for indexing new managed properties, whether these are added by the user, administrator, or service provider. When a new managed property is added to the index portion 405, the updated index portion replaces the old version of the document summaries index file. When a new managed property is initially added, there will be no documents that have values for the new property, but as documents are added (or re-crawled), there will be such property values stored in 420.

Figure 5:
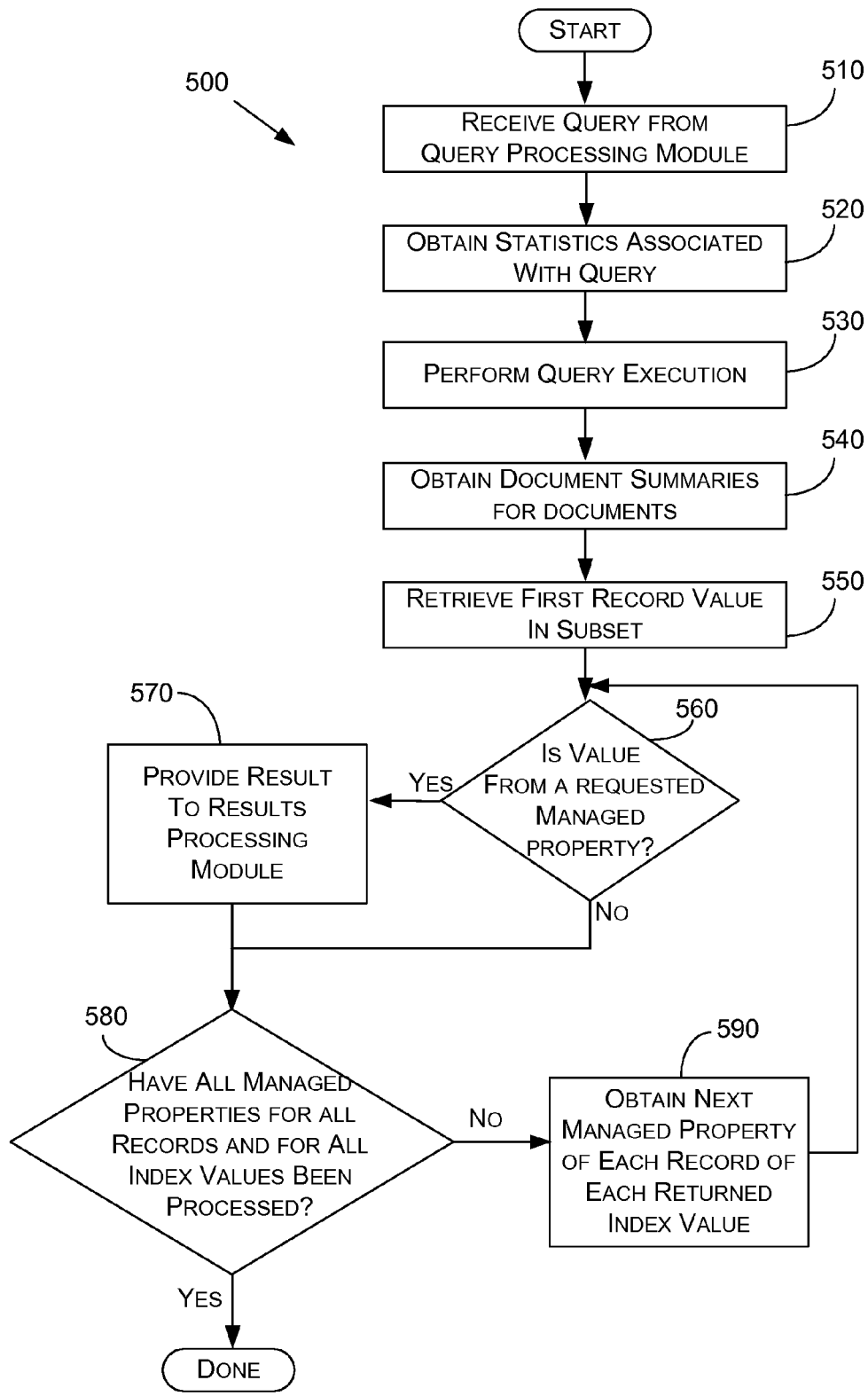
FIG. 5 is a process flow illustrating operations associated with processing a query.

The above process may be executed in the aforementioned server 108. This process is shown in FIG. 5 that illustrates the various operations that may occur in a server in order to process the document summaries index file. It should be appreciated that the logical operations described herein with respect to FIG. 5 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 5 and described herein. These operations may also be performed in a different order than those described herein.

The process 500 of FIG. 5 begins in operation 510 with receiving the query from the query processing module. The query will typically request a search for documents having certain characteristics. For example, the query may include a search for documents that are associated with a user. In other words, the query may be for documents authored by an indicated user, e.g., "John Doe." Specifically, the query may ascertain which documents in the user's file space have the Name field set to "Author" and the corresponding Value field is "John Doe."

In operation 520, various statistics are obtained to determine how many documents are involved meeting the query criteria in the various index nodes. Once this is determined, then in operation 530 the query execution can be performed at the various content domains. This returns a list of document identifiers in operation 540, a subset of which will be presented to the user. In one embodiment, the subset may comprise no more than ten document identifiers.

In operation 550, the first record value from the subset is retrieved. In operation 560, the managed property is analyzed to determine if it is a value that is requested. If so, then in operation 570 the result, which may include the document identifier, is provided to the results processing module. Processing then continues at operation 580. This will typically include the value of the instance of the managed property. If the managed property is not a value requested, then processing continues in operation 580.

At operation 580, a test is determined whether all the managed properties for the records for the subset of index values have been processed. If so, then operation is complete. If not, then in operation 590, the next managed property of the next record of each returned index value is obtained, and the process loops back to operation 560. In this manner, the managed properties of all possible records are examined. For each record having a requested managed property, the record is returned together with the corresponding document identifier.

Figure 6:
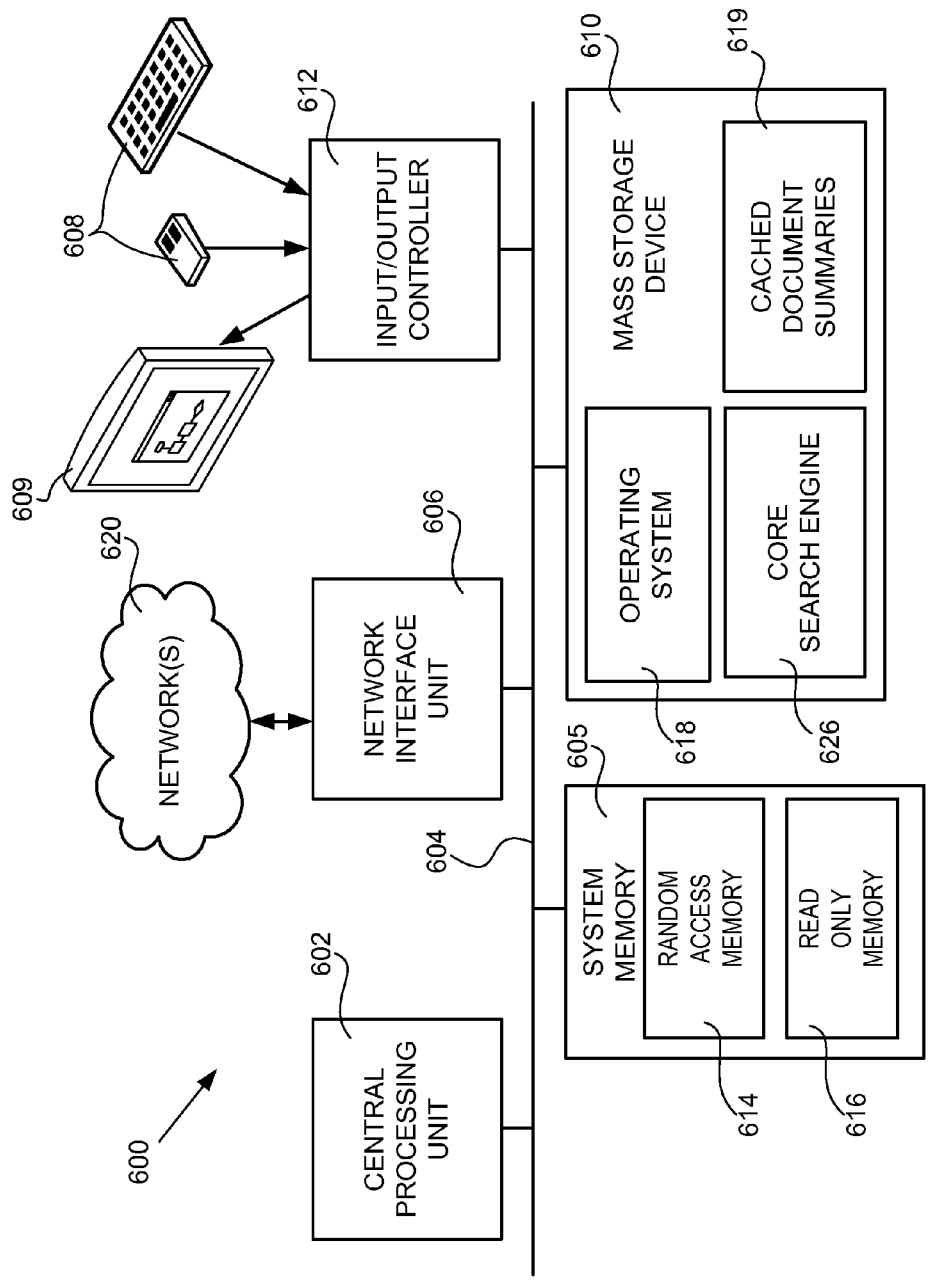
FIG. 6 illustrates a computer architecture of a computing device configured to process the document summaries index file.

The process flow described above and other related functions can be implemented in one embodiment by the computing architecture of a computer device 600 as shown in FIG. 6. FIG. 6 shows an illustrative computing architecture for a computing device capable of executing the processes described. The architecture shown in FIG. 6 may illustrate a server computer 108, desktop computer, or other type of computer utilized to execute any aspect of the software components presented herein, and may also describe the computing device such as a smartphone 101, laptop 102, or tablet computer 105. Other architectures or computers may be used to execute the software components presented herein.

The computer architecture shown in FIG. 6 includes a processor 602 (a.k.a. as a centralized processing unit or "CPU"), a system memory 605, including a random access memory 614 ("RAM") and a read-only memory ("ROM") 616, and a system bus 612 that couples the memory to the CPU 602. A basic input/output system containing the basic routines that help to transfer information between elements within the computing device 600, such as during startup, is stored in the ROM 616. The computing device 600 further includes a mass storage device 610 for storing an operating system 618, application programs, and other program modules, as described herein.

The mass storage device 610 is connected to the CPU 602 through a mass storage controller (not shown), which in turn is connected to the bus 612. The mass storage device 610 and its associated computer-readable media provide non-volatile storage for the computing device 600. Although the description of computer-readable media contained herein refers to a mass storage device, such as a hard disk or CD-ROM drive, it should be appreciated by those skilled in the art that computer-readable media can be any available computer storage media that can be accessed by the computing device 600.

It should be appreciated by those skilled in the art that computer-readable media may be any available media that can be accessed by the computing device 600, including computer-readable storage media and communications media. Communications media includes transitory signals. Computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 600. However, the computer readable storage media does not encompass transitory signals.

According to various embodiments, the computing device 600 may operate in a networked environment using logical connections to remote computers or servers through a network (not shown in FIG. 6). The computing device 600 may connect to the network 620 using an antenna (not shown). In other embodiments, connection to other types of networks may be accomplished using an input/output controller 612. The input/output controller 612 can be used for receiving and processing input from a number of other devices 608, including a keyboard, mouse, or electronic stylus (not shown in FIG. 6). Similarly, an input/output controller 612 may provide output to a display screen 609, a printer, or other type of output device (also not shown in FIG. 6). In one embodiment, the computing device may incorporate a display screen 609 comprising a touch screen display. The touch screen display functions to not only display information, but also to receive input from the user, including inputting text, commands, and controls.

As mentioned briefly above, a number of program modules and data files may be stored in the mass storage device 610 and RAM 614 of the computing device 600, including an operating system 618 suitable for controlling the operation of a networked desktop, laptop, tablet or server computer. The mass storage device 610 and RAM 614 may also store one or more program modules or data files. In particular, the mass storage device 610 and the RAM 614 may store the core search engine logic module 626, as well as the other modules identified. The mass storage device 610 and RAM 614 may also store cached the document summaries index file 401. This may be the entire file comprising the index portion 405 and the record values portion 420, or it may be a subset thereof.

It should be appreciated that the software components described herein may, when loaded into the processor 602 and executed, transform the processor 602 and the overall computing device 600 from a general-purpose computing system into a special-purpose computing system customized to facilitate the functionality presented herein. The processor 602 may be constructed from any number of transistors or other discrete circuit elements, which may individually or collectively assume any number of states. More specifically, the processor 602 may operate as a finite-state machine, in response to executable instructions contained within the software modules disclosed herein. These computer-executable instructions may transform the processor 602 by specifying how the processor 602 transitions between states, thereby transforming the transistors or other discrete hardware elements constituting the processor 602.

Encoding the software modules presented herein may also transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 600 in order to store and execute the software components presented herein. It also should be appreciated that the computing device 600 may comprise other types of computing devices, including hand-held computers, embedded computer systems, personal digital assistants, and other types of computing devices known to those skilled in the art. It is also contemplated that the computing device 600 may not include all of the components shown in FIG. 6, may include other components that are not explicitly shown in FIG. 6, or may utilize an architecture completely different than that shown in FIG. 6.

Based on the foregoing, it should be appreciated that the disclosed document summaries index file structure provides a more efficient and scalable indexing mechanism for performing search queries. It should also be appreciated that the subject matter described above is provided by way of illustration only and should not be construed as limiting. Although illustrated in the context of a document management application, it should be appreciated that the concepts and technologies disclosed herein can be applied to other web-based services and applications. Various modifications and changes may be made to the subject matter described herein without following the example embodiments and applications illustrated and described, and without departing from the true spirit and scope of the present invention, which is set forth in the following claims.

The invention claimed is:

1. A computer implemented method for processing a request for a document search comprising:
   receiving a query for at least one document from an application programming interface wherein the query comprises a search term identifier value and a search term value;
   receiving a document summaries index file into a memory of a computer, the document summaries index file comprising an index portion and a records portion, the index portion comprising a plurality of document identifiers each identifying a document and the records portion comprising at least one record for each document identifier linked to a corresponding document identifier, each record having a structure comprising a name field, a type field, and a value field;
   processing the document summaries index file by a processor of the computer to ascertain for each record in the records portion whether the name field is equal to the search term identifier and if so then determining whether the value field is equal to the search term value; and
   providing to the application programming interface that generated the query each document identifier where the name field is equal to the search term identifier and the value field is equal to the search term value.

2. The computer implemented method of claim 1, wherein the computer is a server is a cloud computing environment.

3. The computer implemented method of claim 2, wherein the request for the document search is for searching for the at least one document associated with a user receiving document management services from the computer.

4. The computer implemented method of claim 2, wherein the name field indicates the value field indicates an author of the document and the value field indicates the author.

5. The computer implemented method of claim 4, wherein the search term identifier indicates the search term value comprises data indicating the author and the search term value comprises data indicating the author.

6. The computer implemented method of claim 2, wherein each record further comprises a field indicating a length of the value field.

7. The computer implemented method of claim 6, wherein each record further comprises an additional field indicating a length of the name field.

8. The computer implemented method of claim 7, wherein each record further comprises a type field indicating a type value of data in the value field.

9. The computer implemented method of claim 3, wherein a subset of a search result comprising a subset of the record values are provided to a client application executing on a user's computer.

10. A computer readable storage medium storing instructions thereon that when executed by a processor cause the processor to:
    receive a query for a document search comprising at least one document wherein the query comprises a search term identifier and a search term value;
    receive a document summaries index file into a memory of a computer, the document summaries index file comprising an index portion and a records portion, the index portion comprising a plurality of document identifiers each identifying a document and the records portion comprising at least one record associated with each document identifier, each record having a structure comprising a name field, a type field, and a value field;
    process the document summaries index file to ascertain for each record in the records portion whether the name field is equal to the search term identifier and if so then determining whether the value field is equal to the search term value; and provide to an application programming interface that generated the query each document identifier where the name field is equal to the search term identifier and the value field is equal to the search term value.

11. The computer readable storage medium of claim 10, wherein the search term identifier indicates the search term value comprises data indicating an author and the search term value comprises data indicating the author.

12. The computer readable storage medium of claim 10, wherein the name field comprises an indication of the value field indicating an author value and the value field indicates the author.

13. The computer readable storage medium of claim 10, wherein the document summaries index file comprises a plurality of document identifiers associated with a single document and a corresponding plurality of records associated with the single document.

14. The computer readable storage medium of claim 13, wherein one of the plurality of record values comprises the name field indicating the contents of the value field indicates a title of a document, and the value field indicates the title of the document.

15. The computer readable storage medium of claim 14, wherein another one of the plurality of record values comprises another name field indicating the contents of another value field, and the another value field indicates a date of the document.

16. A computing system for processing a request for a document search comprising:

a memory storing a document summaries index file comprising an index portion and a records portion, the index portion comprising a plurality of document identifiers each identifying a document and the records portion comprising at least one record for each document identifier, each record having a structure comprising a name field, a type field, and a value field; and a processor configured to receive a query from an application programming interface for the document search wherein the query comprises a search term identifier and a search term value, compare each record in the records portion to ascertain whether the search term identifier matches the name field and if so whether the search term value matches the value field, and provide to the application programming interface that generated the query each document identifier where the search term identifier matches the name field and the search term value matches the value field.

17. The computing system of claim 16, wherein the name field indicates the value field stores an author name and the value field indicates the author name.

18. The computing system of claim 17, wherein the type field indicates a data type of the value field comprises a string data type.

19. The computing system of claim 17, wherein each record further comprises a first length field indicating the length of the name field and a second length field indicating the length of the value field (value column) (col. 2, lines 57-67).

20. The computing system of claim 19, wherein the processor is further configured to: update the document summaries index file structure for a new schema, comprising a second name field indicating a different value than the name field.

\* \* \* \* \*